US009537845B1

(12) United States Patent
Juels et al.

(10) Patent No.: US 9,537,845 B1
(45) Date of Patent: Jan. 3, 2017

(54) DETERMINING AUTHENTICITY BASED ON INDICATORS DERIVED FROM INFORMATION RELATING TO HISTORICAL EVENTS

(71) Applicant: EMC Corporation, Hopkinton, MA (US)

(72) Inventors: Ari Juels, Brookline, MA (US); Ronald L. Rivest, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 65 days.

(21) Appl. No.: 14/042,645

(22) Filed: Sep. 30, 2013

(51) Int. Cl.
*H04L 29/06* (2006.01)
*G06F 21/31* (2013.01)
*G06F 21/44* (2013.01)

(52) U.S. Cl.
CPC ............ *H04L 63/08* (2013.01); *G06F 21/316* (2013.01); *G06F 21/44* (2013.01)

(58) Field of Classification Search
CPC .......... G06F 21/32; G06F 21/34; G06F 21/31; G06F 21/316; G06F 2221/2111; H04L 63/08
See application file for complete search history.

(56) References Cited

U.S. PATENT DOCUMENTS

| | | | |
|---|---|---|---|
| 7,427,033 B1 * | 9/2008 | Roskind | 235/492 |
| 7,502,933 B2 * | 3/2009 | Jakobsson et al. | 713/172 |
| 7,798,416 B2 * | 9/2010 | Roskind | 235/492 |
| 2004/0172535 A1 * | 9/2004 | Jakobsson et al. | 713/168 |
| 2008/0104667 A1 * | 5/2008 | Terada | H04L 63/08 726/2 |
| 2010/0122329 A1 * | 5/2010 | Jakobsson et al. | 726/6 |
| 2010/0153451 A1 * | 6/2010 | Delia | G06F 21/316 707/781 |
| 2010/0175116 A1 * | 7/2010 | Gum | G06F 21/31 726/6 |

OTHER PUBLICATIONS

K.D. Bowers et al., "Drifting Keys: Impersonation Detection for Constrained Devices," Proceedings of the IEEE INFOCOM, Apr. 2013, 12 pages, Turin, Italy.
K. Elkhiyaoui et al., "Checker: On-Site Checking in RFID-Based Supply Chains," Proceedings of the 5th ACM Conference on Security and Privacy in Wireless and Mobile Networks (WISEC), Apr. 2012, pp. 173-184.

(Continued)

*Primary Examiner* — Tae Kim
(74) *Attorney, Agent, or Firm* — Ryan, Mason & Lewis, LLP

(57) ABSTRACT

A method comprises storing in a memory of a first processing device information relating to one or more historical events visible to the first processing device and a second processing device. The method further comprises, in an authentication sessions between the first processing device and the second processing device, transmitting an indicator derived from at least a portion of the stored information from the first processing device to the second processing device. The indicator permits the second processing device to determine authenticity of the first processing device.

20 Claims, 3 Drawing Sheets

(56) References Cited

OTHER PUBLICATIONS

J. Hastad et al., "Funkspiel Schemes: An Alternative to Conventional Tamper Resistance," Proceedings of the 7th ACM Conference on Computer and Communications Security, 2000, pp. 125-133.

Gene Itkis, "Forward Security—Adaptive Cryptography: Time Evolution," Handbook of Information Security, 2006, 27 pages, John Wiley & Sons.

G. Itkis et al., "SiBIR: Signer-Base Intrusion-Resilient Signatures," Advances in Cryptology (CRYPTO), Proceedings of the 22nd Annual International Cryptology Conference, Lecture Notes in Computer Science (LNCS), Aug. 2002, pp. 499-514, vol. 2442.

* cited by examiner

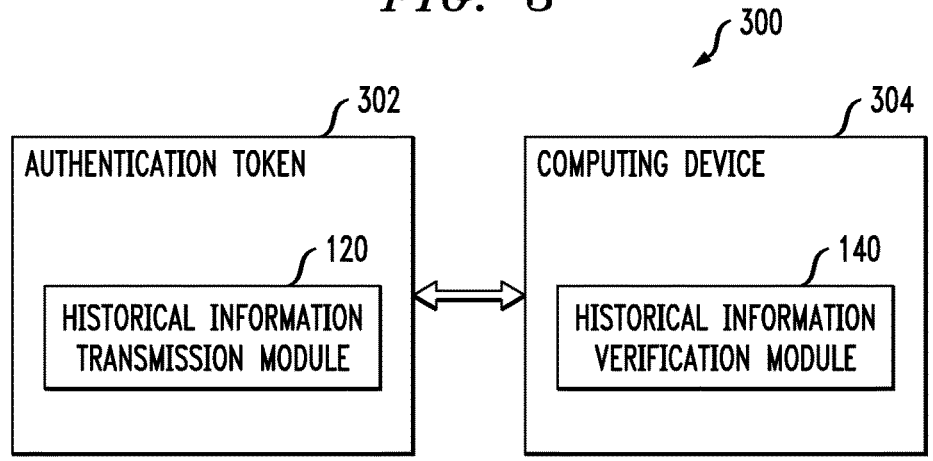
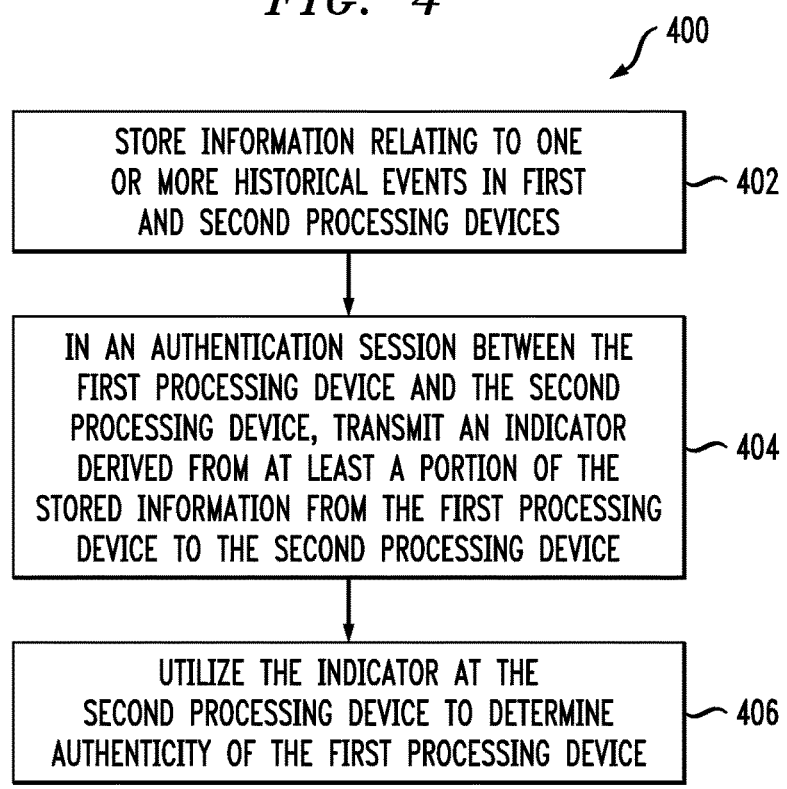

DETERMINING AUTHENTICITY BASED ON INDICATORS DERIVED FROM INFORMATION RELATING TO HISTORICAL EVENTS

FIELD

The field relates generally to security, and more particularly to techniques for verifying the authenticity of devices.

BACKGROUND

Authentication devices typically use a secret or private key to authenticate to a verifying entity. If this key serves as the sole basis of authentication, an adversary that captures it can perfectly impersonate the device. An adversary who captures the secret or private key of an authentication device can simulate communications of the authentication device in a manner indistinguishable from communications of a valid authentication attempt originating from the authentication device. An adversary can obtain keys of an authentication device in a variety of ways, including compromising the authentication device or, in symmetric-key systems, through compromising the verifying entity.

SUMMARY

In one embodiment, a method comprises storing in a memory of a first processing device information relating to one or more historical events visible to the first processing device and a second processing device. The method further comprises, in an authentication sessions between the first processing device and the second processing device, transmitting an indicator derived from at least a portion of the stored information from the first processing device to the second processing device. The indicator permits the second processing device to determine authenticity of the first processing device.

In another embodiment, a method comprises storing in a memory of a first processing device information relating to one or more historical events visible to the first processing device and a second processing device. The method also comprises, in an authentication session between the first processing device and the second processing device, receiving at the second processing device from the first processing device an indicator derived from at least a portion of the stored information. The method further comprises utilizing the indicator to determine authenticity of the second processing device.

These and other features and advantages of embodiments of the present invention will become more readily apparent from the accompanying drawings and the following detailed description.

BRIEF DESCRIPTION OF THE DRAWINGS

FIG. 3 shows another possible implementation of the FIG. 1 system including an authentication token and a computing device in an illustrative embodiment of the invention.

FIG. 4 is a flow diagram of a historical information transmission process in an illustrative embodiment of the invention.

DETAILED DESCRIPTION

Figure 1:
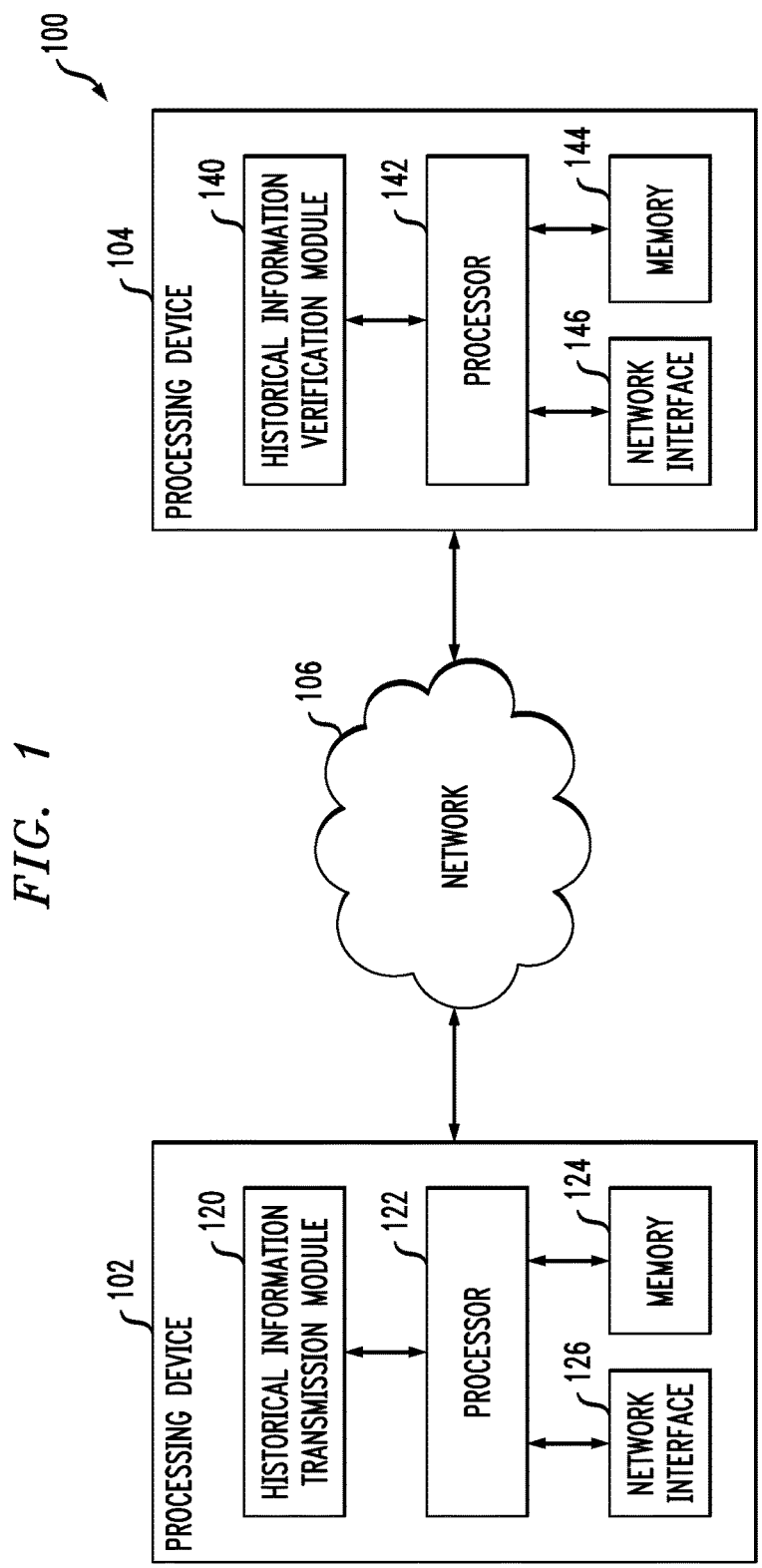
FIG. 1 is a block diagram of a communication system with historical information transmission functionality in an illustrative embodiment of the invention.

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the teim "communication system" as used herein is intended to be broadly construed, so as to encompass, for example, systems in which multiple processing devices communicate with one another but not necessarily in a manner characterized by a client-server model.

The term "processing device" as used herein is intended to be construed broadly, so as to encompass a wide variety of devices. Processing devices include, by way of example, authentication tokens, smartcards, radio frequency identification (RFID) tags and other lightweight devices. Processing devices also include computing devices, including desktop computing devices and mobile computing devices such as cell phones, tablets, laptops, etc. The term "authentication server" should be understood to encompass any type of processing devices or set of such devices that is operative to authenticate a passcode provided by another processing device. An authentication server need not be a network-based server, and may be implemented as a portion of a device that performs other functions, as a combination of multiple servers or other devices, or in other forms.

As described above, an authentication device relying on a secret or private key for authenticating a user can be compromised by an adversary that captures the secret or private key. An authentication device is an example of a processing device. Countermeasures to key theft cause or rely on state changes in the authentication device that lead to a divergence between its state and that of the adversary's impersonation device. Such divergence can facilitate detection of the fact that an adversary has made an authentication attempt.

Detection schemes may involve tracking device state changes that enforce the random evolution of the key state for an authentication device. Techniques which rely on key evolution can generally achieve high security but may require considerable bandwidth. High-bandwidth devices can generate a fresh, authenticated key in every communication with a verifier and ensure synchronization of these keys with the verifier by transmitting the current key along with all previously generated keys, or a portion or digest thereof, in each authentication session. The entropy of even a modest-length key will in most cases easily exceed that of the ordinary contextual information visible to the authentication device and verifier in an authentication session.

Embodiments of the invention provide techniques which utilize a history of interactions or other events between an authentication device and a verifying device for determining authenticity of the authentication device. Determining authenticity of a device comprises detecting whether an impersonation attempt has occurred or is likely to have occurred, as will be described in further detail below. An authentication device in embodiments of the invention transmits indicators that are based at least in part on one or more historical events visible to the authentication device and a verifying device. The indicators are utilizable by the verifying device for determining authenticity of the authentication device. For example, divergence between the history reported by the authentication device and the observations of the verifying device can be used to determine possible impersonation of the authentication device.

Techniques which utilize historical information for determining authenticity of a device can provide advantages relative to techniques which rely on key evolution for bandwidth-constrained systems. In addition, techniques which utilize historical information may complement or supplement techniques which rely on key evolution for added security. In some cases, the information content of history shared between an authentication device and a verifying device can exceed that of shared evolving keys.

FIG. 1 illustrates a communication system 100 including a processing device 102 and a processing device 104 connected via network 106. The processing device 102 comprises historical information transmission module 120, processor 122, memory 124 and network interface 126. The processing device 104 comprises historical information verification module 140, processor 142, memory 144 and network interface 146.

In the system 100, the processing device 102 is an example of an authenticating device and the processing device 104 is an example of a verifying device. It is to be appreciated, however, that in other systems a processing device may be configured as both an authenticating device and a verifying device. For example, a first processing device may act as both an authenticator towards a second processing device acting as a verifier and as a verifier towards a third processing device acting as an authenticator. Thus, in some embodiments a processing device may include both a historical information transmission module 120 and historical information verification module 140 in addition to a processor, memory, network interface and other components.

The historical information transmission module 120 and historical information verification module 140 comprise respective functional modules which may be implemented via hardware, software or a combination of hardware and software to provide functionality to be described below.

The processors 122 and 142 may comprise respective microprocessors, microcontrollers, application-specific integrated circuits (ASICs), field-programmable gate arrays (FPGAs) or other type of processing circuitry, as well as portions or combinations of such circuitry elements.

The memories 124 and 144 may comprise random access memory (RAM), read-only memory (ROM) or other types of memory, in any combination. The memories 124 and 144 and other memories disclosed herein may be viewed as examples of what are more generally referred to as processor-readable storage media storing executable program code.

The network interfaces 126 and 146 allow the respective processing devices 102 and 104 to communicate with one another and other devices via network 106.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

It is to be appreciated that the particular set of elements shown in FIG. 1 in system 100 is presented by way of example, and in other embodiments additional or alternative elements may be used. Thus, another embodiment may include additional networks, devices, servers, etc. For example, a system may include multiple additional processing devices which communicate with one another via one or more networks.

The system 100 may include additional or alternative processing platforms, as well as numerous distinct processing platforms in any combination, with each such platform comprising one or more computers, servers, storage devices or other types of processing devices. For example, the processing device 102 and/or the processing device 104 may be implemented via one or more processing platforms.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

The processing device 102 may act as an authenticator and the processing device 104 may act as a verifier. In an authentication session between the processing device 102 and the processing device 104, the processing device 104 may transmit a full transcript of all times $T=\{t_1, t_2, \ldots\}$ at which the processing device 102 has invoked an authentication application to the processing device 104. If an adversary learns the secret state of the processing device 102, the adversary may seek to impersonate the processing device at some time $t^*$ prior to the next valid authentication by the processing device 102. The adversary may passively compromise the processing device 102.

The adversary, having knowledge of the secret state of the device, may successfully authenticate to the processing device 104 at time $t^*$. When the processing device 102 next attempts to authenticate to the processing device 104, however, the processing device 102 will present a transcript T such that $t^* \notin T$. Thus, the processing device 104 will determine that an impersonation attempt has occurred.

In some embodiments, the processing device 102 is output-constrained and is capable of sensing conditions surrounding its use to record an authentication-related history. Such conditions include, by way of example, time of use and location of use.

Examples of output-constrained devices include certain types of authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Authentication tokens include both time-synchronous and event-synchronous tokens. In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Other types of authentication tokens include hybrid time-synchronous and event-synchronous tokens.

Passcodes can be communicated directly from the authentication token to a computer or other element of an authentication system, instead of being displayed to the user. For example, a wired connection such as a universal serial bus (USB) interface may be used for this purpose. Wireless authentication tokens are also known. In authentication tokens of this type, the passcodes are wirelessly communicated to a computer or other element of an authentication system. These wired or wireless arrangements, also referred to herein as connected tokens, save the user the trouble of reading the passcode from the display and manually entering it into the computer.

The above arrangements may be viewed as examples of what are more generally referred to herein as hardware authentication tokens. However, authentication tokens can also be implemented in the form of software installed on a computer, mobile phone or other processing device. Like hardware authentication tokens, software authentication tokens can be implemented as time-synchronous, event-synchronous, or hybrid time, synchronous and event-synchronous tokens.

Hardware and software authentication tokens and other types of one-time passcode (OTP) devices are typically programmed with a random seed or other type of key that is also stored in a token record file. The record file is loaded into an authentication server, such that the server can create matching passcodes for the authentication token based on the key and the current time or current event count.

In order to protect authentication tokens against cloning attacks, the keys used by these tokens may be periodically refreshed using an approach known as drifting keys, in which a set of secret keys shared between an authentication token and an authentication server evolve randomly over time. Periodic refresh operations are applied to the set of keys, typically at the start of respective time periods.

Authentication tokens, such as the standalone hardware tokens described above, are capable of detecting authentication attempts by a user or at least user interaction with the token. Such authentication tokens, however, may also be incapable of conveying detailed information about state changes to a verifier due to hardware constraints.

Transmission constrained sensor nodes, such as RFID tags, may also be incapable of conveying detailed information about state changes to a verifier. RFID tags are inexpensive wireless microchips. RFID tags may be used to identify physical objects, and may be present in a variety of objects including passports, drivers' licenses, shipping cases, clothing, payment cards, etc. A major driver of the deployment of RFID systems is to prevent and detect counterfeiting.

Authentication tokens and RFID tags are examples of devices which may be output-constrained and are capable of harvesting or otherwise collecting information about their use, such as times of use or locations of use. These devices, however may only be capable of conveying information sparingly to a verifier due to memory, bandwidth or other types of hardware constraints.

Embodiments are thus well suited for use in authentication tokens, RFID tags and other types of output-constrained devices. It is important to note, however, that embodiments are not limited solely to use with such output-constrained devices. Instead, embodiments may be utilized in devices which are not output-constrained, in addition to or in place of other techniques used to determine authenticity of an authentication device.

As discussed above, embodiments utilize techniques whereby information related to historical events is transmitted between processing devices in an authentication session. In order to verify a chain of events or an indicator which is based on information relating to historical events, the authenticator and verifier must both have knowledge of the events, e.g., the history used for authentication should be visible to both the authenticating device and the verifying device. Use of events which are visible to the authenticating device but not the verifier may be considered analogous to synthetic state evolution techniques as described above, where state change may be random in the view of the verifier.

As described above, drifting keys (DKs) are a key-evolving synthetic scheme for impersonation detection in low-bandwidth devices. An authenticating device may transmit two bits of DK state each authentication session. Thus, an adversary has a ¼ chance of guessing these bits correctly and impersonating a user. The probability of impersonation rises for an authentication device or user which authenticates infrequently. For technical reasons, an adversary without login time constraints can choose a time to authenticate such that old DK bits do not affect the token's emissions. Such infrequently used tokens are likely to be targeted by adversaries.

In some embodiments, a channel for communication of historical information may have a capacity of one bit. For clarity, $\mathcal{D}$ is used to denote an authenticating device and $\mathcal{V}$ is used to denote a corresponding verifying device. A scheme for encoding the history of events by transmitting a single bit b may be as follows:

$$b = \begin{cases} \text{`0'} & \text{if the authentication device was used within} \\ & \text{the first 27 days of the past 28-day interval} \\ \text{`1'} & \text{otherwise} \end{cases} \quad (1)$$

As an example a user may authenticate using D once every four weeks. DKs, as noted, may fail to detect an impersonation attempt by an adversary that doesn't face constraints on its login time. However, a sequence of three events may be as follows: (1) a user of $\mathcal{D}$ may authenticate to $\mathcal{V}$ at the beginning of week 1; (2) an adversary compromises the state of $\mathcal{D}$ and then, at the beginning of week 3, impersonates $\mathcal{D}$ in an authentication sessions with $\mathcal{V}$; and (3) at the beginning of week 5, the user of $\mathcal{D}$ authenticates to $\mathcal{V}$. In this sequence, when event (3) occurs, a '1' bit will be transmitted on the historical information communication channel. Thus, $\mathcal{V}$ will determine that event (2) was an impersonation attempt.

In this example, replacing the bit of the historical information transmission channel with an extra DK bit will not result in a higher detection rate due to the vulnerability of synthetic schemes to devices which are used infrequently. Thus, embodiments may combine synthetic techniques with historical information transmission techniques. Embodiments can mitigate the weakness of synthetic schemes with respect to infrequent use of an authentication device that can result in a failure of $\mathcal{V}$ to accurately track state changes in $\mathcal{D}$.

It is important to choose the historical events used for transmission and authenticity determinations with care. For example, an encoding may be a bit that indicates whether a device went unused over the past month. Often, an attempt at authentication may fail due to mistypes PINS, passcodes, time synchronization problems, accidental token application launch on a smartphone, etc. If the user makes a failed authentication attempt, the '1' bit in the historical information transmission channel will change to a '0' bit, and the event (2) in the example above will go undetected in the user's next successful authentication attempt.

As such, embodiments may use the "interval-A-within-interval-B" encoding described above in equation 1, wherein interval A is the first 27 days of the past 28-day interval and interval B is the past 28 days. This encoding is a more flexible representation of gaps in device use which avoids this issue. It is important to note, however, that the particular intervals A and B are not limited solely to 27 and 28 days, respectively. Instead, various other intervals may be selected for use for a particular application, including different numbers of seconds, minutes, hours, days, weeks, etc.

Various other encodings may be used in other embodiments of the invention. For example, an encoding of historical information may indicate whether a device was used in each of two or more defined time intervals. As an example, the bit b may be encoded as follows:

$$b = \begin{cases} \text{`0'} & \text{if the authentication device was used in each} \\ & \text{week over a four-week interval} \\ \text{`1'} & \text{otherwise} \end{cases} \quad (2)$$

Again, the particular intervals in equation 2 are presented by way of example only. Various other intervals may be used. For example, the bit b may be '0' if the authentication device was used in x distinct weeks over a y-week interval.

In some embodiments, the historical information transmission scheme may take a form in which a channel symbol set is represented by S, where S={0,1} in the 1-bit example described above. H={$h_1$, ..., $h_t$} denotes the history of $\mathcal{D}$ through the current time t, where $h_t \in L$ denotes an event within a language L of historical information transmission-related events (e.g., stored historical event information). The emission on the historical information transmission channel at time t is computed by means of a function $f_t: L^t \to S$.

In some embodiments, the authentication device performs non-trivial compression of historical events. In other words, $f_t$ does not perform sampling of or truncation to a fixed portion of H, e.g., the function $f_t$ does not simply output the last event in H. For example, let L and S be bit-string spaces where L={0,1}$^l$ and S={0,1}$^s$ and let H be represented as $h_1 \| \ldots, \| h_t$. In these embodiments, there is no deterministic function g such that for all H, g($f_t$(H)) is a substring of H.

The function f may be defined as follows for the encoding of a bit b in equation 1. $f(h_1, \ldots, h_t)=0$ if there exists a pair ($h_i$, $h_{i+1}$) such that T$-h_i \le 4$ for current time T and $h_{i+1} - h_i \ge 3$, where t is the total number of uses of $\mathcal{D}$ and $h_i$ denotes a timestamp on the $i^{th}$ use computed in weeks.

Authentication attempts using $\mathcal{D}$ are visible to $\mathcal{V}$. In other words, $\mathcal{V}$ learns information about these events. In contrast, there may be other historical events which are opaque to $\mathcal{V}$. For example, photos take on a mobile phone running an authentication application may in some cases be opaque to $\mathcal{V}$ and thus not suited for use as historical events in embodiments of the invention. It is important to note, however, that in some cases an authentication application running on a smartphone may be configured such that photos are visible to $\mathcal{V}$. Thus, photos are not necessarily excluded as being used as historical events for transmitting indicators in embodiments of the invention.

Historical information transmission techniques rely on historical events for which $\mathcal{V}$ learns some information. As described above, timestamps associate with previous authentication sessions are one example of information visible to $\mathcal{V}$. Embodiments, however, are not limited solely to use with timestamps associated with historical events. In some embodiments, location information may be utilized. Many mobile devices contain global positioning system (GPS) receivers, permitting the use of geolocation as event information. A verifying server may receive an indication of the geolocation of a user by way of a user's internet protocol (IP) address. Thus, for example, a bit b used in the historical information transmission may be encoded as follows:

$$b = \begin{cases} \text{`0'} & \text{if the authentication device was used strictly within} \\ & \text{a 100-mile radius over the past four weeks} \\ \text{`1'} & \text{otherwise} \end{cases} \quad (3)$$

As will be appreciated, the specification of a particular location region (e.g., the 100-mile radius in equation 3) is presented by way of example only. Embodiments may use various other constraints for defining geographic regions. In addition, the bit b may be encoded in a variety of ways using location information. For example, the bit b may alternately be encoded such that b is '0' if the authentication device was used in each of two or more distinct geographic regions over a defined time interval or in some portion of two or more distinct geographic regions over a defined time interval.

In some embodiments, an authentication session may be associated with a request for a particular resource. For example, in some mobile handsets a single, legacy OTP system may be used for access to different resources, e.g., e-mail access and payroll access. In this case, both $\mathcal{D}$ and $\mathcal{V}$ may have awareness of the resource request triggering the authentication request. Thus, the bit b may be encoded based on the resource request.

It is important to note that while embodiments have been described above with respect to historical information transmission using only a single bit b, embodiments are not limited solely to transmission of a single bit. Instead, in some embodiments two bits may be used for transmitting indicators based on historical information. For example a first bit may be encoded as shown in equation 1 while a second bit is encoded as shown in equation 3. In addition, the bit b may encode information relating to multiple characteristics. As an example, the bit b may encode the time at which historical events occurred in combination with the locations at which historical events occurred.

Figure 2:
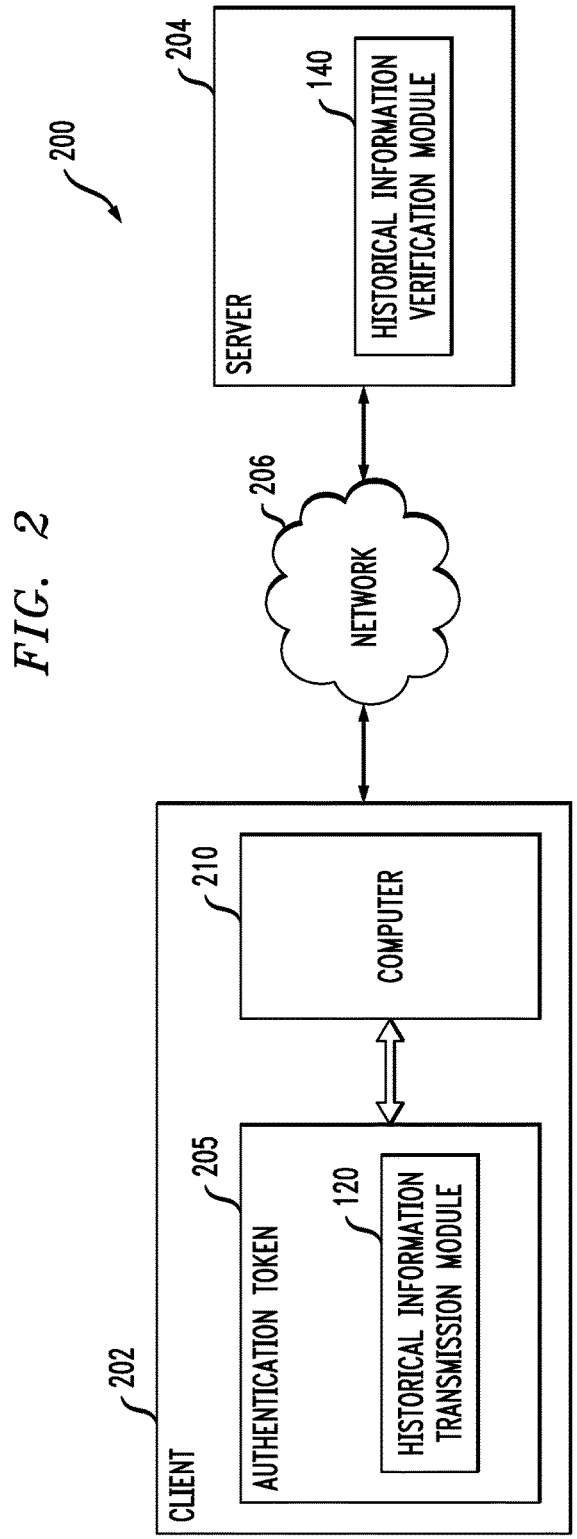
FIG. 2 shows one possible implementation of the FIG. 1 system including an authentication token and an authentication server in an illustrative embodiment of the invention.

FIG. 2 shows an example of a communication system 200 corresponding generally to an implementation of the communication system 100. In the communication system 200, a client 202 and server 204 communicate over a network 206. The client 202 comprises an authentication token 205 and computer 210. The authentication token 205, which implements historical information transmission module 120, is an example of the authentication device $\mathcal{D}$ described above. The server 202, which implements historical information verification module 140, is an example of the verifier $\mathcal{V}$ described above. The authentication token 205 may communicate with the server 204 via a host device such as computer 210.

The authentication token 205 and computer 210 may be connected via a wired interface such as a USB interface or may connect wirelessly via a Bluetooth connection, an IEEE 802.11 connection, a Near Field Communication (NFC) interface, etc. The authentication token 205 may alternatively comprise a display for presenting a passcode and the indicator derived from historical information stored on the authentication token 205.

The computer 210 may be a desktop or portable personal computer, mobile telephone, personal digital assistant (PDA), wireless email device, workstation, kiosk, television set-top box, game console, or any other processing device that provides an interface between authentication token 205 and server 202. Information, including the indicator derived from historical information stored in a memory (not shown) of the authentication token 205 may be transmitted to the server 204 via the computer 210.

The authentication token 205 may be a hardware authentication token or a software authentication token. In some embodiments, the authentication token 205 may comprise an RSA SecurID® user authentication token, suitably modified as disclosed herein. It should also be noted that a given authentication token need not take the foam of a stand-alone hardware token. For example, such a device may be incorporated into another processing device, such as a computer, mobile telephone, etc. In one such implementation, the computer 210 and authentication token 205 may be combined into a single processing device that communicates with the server 204.

In the system 200, the authentication token 205 may be used by the computer 210 to authenticate a user of the computer 210 to the server 204. In an authentication session, the authentication token 205 via historical information transmission module 120 generates an indicator which is based in part on information relating to one or more historical events stored in the authentication token 205 and/or computer 210. This indicator is transmitted from the authentication token 205 to the computer 210 and from the computer 210 to the server 204 for authenticating a user of the computer 210 to the server 204. The server 204 via historical information verification module 140 uses the transmitted indicator to determine authenticity of the authentication token 205.

FIG. 3 illustrates another example of a communication system 300 corresponding generally to an implementation of communication system 100. In the communication system 300, an authentication token 302 communicates with computing device 304. The authentication token 302 is an example of the authentication device $\mathcal{D}$ and the computing device 304 is an example of the verification device $\mathcal{V}$ described above.

In the communication system 300, the authentication token 302 via historical information transmission module 120 generates an indicator which is based in part on information relating to one or more historical events stored in the authentication token 302. This indicator is transmitted from the authentication token 302 to the computing device 304 for authenticating to the computing device 304, rather than an external server as in system 200. The computing device 304 via historical information verification module 140 uses the transmitted indicator to determine authenticity of the authentication token 302.

Although not explicitly shown in FIGS. 2 and 3, the authentication token 205, computer 210, server 204, authentication 302 and computing device 304 may comprise respective processors, memories and network interfaces similar to the processor 122, memory 124 and network interface 126 described above with respect to processing device 102 of system 100.

It is to be appreciated that the systems 200 and 300 may in some embodiments be combined. For example, an authentication token may be used for authenticating to a computer as well as a remote server, or may be used for authenticating to multiple distinct remote servers. The authentication token can store information relating to historical events for each of the servers and/or computing devices to which it authenticates. In addition, a processing device in general may store information relating to historical events visible to a number of distinct servers for transmitting indicators of such historical events to respective servers for authentication.

FIG. 4 illustrates a flow diagram for a historical information transmission process 400. The process 400 begins with step 402, where first and second processing devices store information relating to one or more historical events. The first processing device may be, by way of example, the processing device 102 in system 100, the authentication token 205 in system 200 or the authentication token 302 in system 300. The second processing device may be, by way of example, the processing device 104 in system 100, the server 204 in system 200 or the the computing device 304 in system 300.

In step 404, the first processing device transmits an indicator derived from at least a portion of the stored information to the second processing device. Step 404 occurs during an authentication session between the first processing device and the second processing device. In step 406, the second processing device utilizes the indicator to determine authenticity of the first processing device.

Authentication sessions may use a wide variety of authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The particular processing operations and other system functionality described in conjunction with the FIGS. 1-4 are presented by way of illustrative example only, and should not be construed as limiting the scope of the invention in any way. For example, the ordering of the process steps may be varied in other embodiments, or certain steps may be performed concurrently with one another rather than serially.

The foregoing examples are intended to illustrate aspects of certain embodiments of the present invention and should not be viewed as limiting in any way. Other embodiments can be configured that utilize different techniques, as well as combinations of the above-described techniques. For example, particular features described above with respect to a given embodiment are not restricted solely for use in the given embodiment unless otherwise noted. Instead, embodiments of the invention may combine features described above in conjunction with different embodiments.

It is to be appreciated that the processing functionality such as that described in conjunction with the FIGS. 1-4 and the associated examples above can be implemented at least in part in the form of one or more software programs stored in memory and executed by a processor of a processing device such as outsourcing device 102. As noted above, a memory or other storage device having such program code embodied therein is an example of what is more generally referred to herein as a processor-readable storage medium.

Articles of manufacture comprising such processor-readable storage media are considered embodiments of the present invention. A given such article of manufacture may comprise, for example, a storage device such as a storage disk, a storage array or an integated circuit containing memory. The term "article of manufacture" as used herein should be understood to exclude transitory, propagating signals.

It is to be appreciated that the particular configuration, elements and operating parameters of the embodiments described above are not requirements of the invention, and should not be construed as limiting the scope of the invention in any way. For example, indicators may be based on various other types of historical events and information, including combinations of different types of historical events or other information. Those skilled in the art can make these and other modifications in the described embodiments in a straightforward manner.

Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   storing in a memory of a first processing device information relating to one or more historical events visible to the first processing device and a second processing device, the one or more historical events being associated with at least a first authentication session between the first processing device and the second processing device; and
   in a second authentication session between the first processing device and the second processing device:
      generating, in the first processing device, an indicator derived from at least a portion of the stored information; and
      transmitting the indicator from the first processing device to the second processing device;
   wherein the stored information comprises at least one of:
      a time at which a given historical event of the first authentication session occurred; and
      a location at which the given historical event of the first authentication session occurred;
   wherein the indicator permits the second processing device to determine authenticity of the first processing device by verifying the indicator using information stored at the second processing device relating to the one or more historical events, the information stored at the second processing device relating to the one or more historical events being stored at the second processing device prior to receipt of the indicator by the second processing device;
   wherein the indicator comprises a single bit value indicating whether the given historical event occurred during a first interval within a second interval, the second interval being longer than and containing the first interval;
   wherein the first interval and the second interval have respective predefined lengths; and
   wherein the second interval ends at a current time.

2. The method of claim 1, wherein the stored information comprises information relating to respective times at which one or more historical events occurred.

3. The method of claim 2, wherein the indicator comprises an indication of whether at least one historical event occurred in a given period of time.

4. The method of claim 2, wherein the indicator comprises an indication of whether at least one historical event occurred in each of two or more distinct periods of time.

5. The method of claim 2, wherein the indicator comprises an indication of whether at least one historical event occurred in a given portion of a plurality of distinct periods of time.

6. The method of claim 1, wherein the stored information comprises information relating to respective locations at which one or more historical events occurred.

7. The method of claim 6, wherein the indicator comprises an indication of whether at least one historical event occurred with a given geographic area.

8. The method of claim 6, wherein the indicator comprises an indication of whether at least one historical event occurred in each of two or more distinct geographic areas.

9. The method of claim 1, wherein:
   the stored information comprises information relating to respective times at which one or more historical events occurred and respective locations at which one or more historical events occurred; and
   the indicator comprises an indication of whether at least one historical event occurred during a given time period within a given geographic area.

10. The method of claim 1, wherein the indicator is a single bit.

11. An article of manufacture comprising a processor-readable storage medium having embodied therein one or more software programs, wherein the one or more software programs when executed cause the first processing device to perform the method of claim 1.

12. The method of claim 1, wherein:
   the first authentication session is associated with a corresponding resource request for a given one of a plurality of resources; and
   the indicator comprises an indication of the given resource corresponding to the first authentication session.

13. An apparatus comprising:
   a first processing device comprising:
      a memory; and
      a processor coupled to the memory;
   the first processing device implementing a historical information transmission module configured to:
      store in the memory information relating to one or more historical events visible to the first processing device and a second processing device, the one or more historical events being associated with at least a first authentication session between the first processing device and the second processing device; and
      in a second authentication session between the first processing device and the second processing device:
         generate an indicator derived from at least a portion of the stored information; and
         transmit the indicator to the second processing device;
   wherein the stored information comprises at least one of:
      a time at which a given historical event of the first authentication session occurred; and
      a location at which the given historical event of the first authentication session occurred;

wherein the indicator permits the second processing device to determine authenticity of the first processing device by verifying the indicator using information stored at the second processing device relating to the one or more historical events, the information stored at the second processing device relating to the one or more historical events being stored at the second processing device prior to receipt of the indicator by the second processing device;

wherein the indicator comprises a single bit value indicating whether the given historical event occurred during a first interval within a second interval, the second interval being longer than and containing the first interval;

wherein the first interval and the second interval have respective predefined lengths; and wherein the second interval ends at a current time.

14. The apparatus of claim 13, wherein:

the stored information comprises information relating to respective times at which one or more historical events occurred and respective locations at which one or more historical events occurred; and the indicator comprises an indication of whether at least one historical event occurred during a given time period within a given geographic area.

15. The apparatus of claim 13, wherein the first processing device comprises an authentication token.

16. A method comprising:

storing in a memory of a first processing device information relating to one or more historical events visible to the first processing device and a second processing device, the one or more historical events being associated with at least a first authentication session between the first processing device and the second processing device;

in a second authentication session between the first processing device and the second processing device, receiving at the first processing device from the second processing device an indicator derived from at least a portion of the stored information; and utilizing the indicator to determine authenticity of the second processing device by verifying the indicator using the stored information relating to the one or more historical events, the stored information relating to the one or more historical events being stored in the memory of the first processing device prior to receipt of the indicator from the second processing device;

wherein the stored information comprises at least one of:
a time at which a given historical event of the first authentication session occurred; and
a location at which the given historical event of the first authentication session occurred;

wherein the indicator is generated in the second processing device;

wherein the indicator comprises a single bit value indicating whether the given historical event occurred during a first interval within a second interval, the second interval being longer than and containing the first interval;

wherein the first interval and the second interval have respective predefined lengths; and wherein the second interval ends at a current time.

17. The method of claim 16, wherein:

the stored information comprises information relating to respective times during which one or more historical events occurred and respective locations at which one or more historical events occurred; and the indicator comprises an indication of whether at least one historical event occurred during a given time period within a given geographic area.

18. An article of manufacture comprising a processor-readable storage medium having embodied therein one or more software program, wherein the one or more software programs when executed cause the first processing device to perform the method of claim 16.

19. An apparatus comprising:

a first processing device comprising:
a memory; and
a processor coupled to the memory;

the first processing device implementing a historical information verification module configured to:

store in the memory of the first processing device information relating to one or more historical events visible to the first processing device and a second processing device, the one or more historical events being associated with at least a first authentication session between the first processing device and the second processing device;

in a second authentication session between the first processing device and the second processing device, receive from the second processing device an indicator derived from at least a portion of the stored information; and utilize the indicator to determine authenticity of the second processing device by verifying the indicator using the stored information relating to the one or more historical events, the stored information relating to the one or more historical events being stored in the memory of the first processing device prior to receipt of the indicator from the second processing device;

wherein the stored information comprises at least one of:
a time at which a given historical event of the first authentication session occurred; and
a location at which the given historical event of the first authentication session occurred;

wherein the indicator is generated in the second processing device;

wherein the indicator comprises a single bit value indicating whether the given historical event occurred during a first interval within a second interval, the second interval being longer than and containing the first interval;

wherein the first interval and the second interval have respective predefined lengths; and wherein the second interval ends at a current time.

20. The apparatus of claim 19, wherein:

the stored information comprises information relating to respective times at which one or more historical events occurred and respective locations at which one or more historical events occurred; and the indicator comprises an indication of whether at least one historical event occurred during a given time period within a given geographic area.

* * * * *